(12) United States Patent
Messmer et al.

(10) Patent No.: US 9,549,197 B2
(45) Date of Patent: Jan. 17, 2017

(54) VISUAL DYNAMIC RANGE TIMESTAMP TO ENHANCE DATA COHERENCY AND POTENTIAL OF METADATA USING DELAY INFORMATION

(75) Inventors: Neil W. Messmer, Langley (CA); Brent Wilson, Belcarra (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 870 days.

(21) Appl. No.: 13/195,300

(22) Filed: Aug. 1, 2011

(65) Prior Publication Data

US 2012/0038782 A1 Feb. 16, 2012

Related U.S. Application Data

(60) Provisional application No. 61/373,932, filed on Aug. 16, 2010.

(51) Int. Cl.
*H04N 7/00* (2011.01)
*H04N 19/467* (2014.01)
*H04N 21/84* (2011.01)

(52) U.S. Cl.
CPC ............ *H04N 19/467* (2014.11); *H04N 21/84* (2013.01)

(58) Field of Classification Search
CPC .............................. H04N 19/467; H04N 21/84
USPC .............. 375/219, 240.26; 340/435; 348/43; 709/203; 382/232; 398/41
See application file for complete search history.

(56) References Cited

U.S. PATENT DOCUMENTS

| | | | | |
|---|---|---|---|---|
| 5,040,138 A | * | 8/1991 | Maher, III | ................ G06F 7/48 708/205 |
| 5,481,543 A | | 1/1996 | Veltman | |
| 7,428,696 B2 | | 9/2008 | Shin | |
| 2001/0022792 A1 | * | 9/2001 | Maeno | .............. G06F 17/30436 370/521 |
| 2001/0029457 A1 | * | 10/2001 | Shaffer | ............. G06F 17/30017 704/504 |
| 2002/0003795 A1 | * | 1/2002 | Oskouy | ................... H04L 12/56 370/389 |
| 2003/0026447 A1 | * | 2/2003 | Fridrich | .................. G06T 1/005 382/100 |
| 2003/0133448 A1 | * | 7/2003 | Frink | ............... H04N 21/43615 370/389 |
| 2003/0163477 A1 | * | 8/2003 | Visharam | ......... H04N 21/23424 |
| 2004/0001592 A1 | * | 1/2004 | Akiwumi-Assani | H04N 21/4623 380/271 |

(Continued)

FOREIGN PATENT DOCUMENTS

EP 1137286 9/2001

*Primary Examiner* — Jay Patel
*Assistant Examiner* — Joseph Suh (57) ABSTRACT

A system and method for enhancing data coherency and potential of at least one metadata associated with a video data configured to operate in a visual dynamic range (VDR) format are detailed. One system embodiment employs a metadata framing structure which includes a header start of frame bit set, a packet type bit set, a configuration bit set, a variable depth configuration/metadata bit set, a header end of frame bit set, a timestamp bit set for specifying a frame delay count to apply the at least one metadata to the video data and a checksum check bit set. The at least one metadata is designed to embed within a code word guard bit position of at least one color channel of the video data and adaptable to embed within the VDR pipeline to enhance the quality of the video data.

9 Claims, 5 Drawing Sheets

(56) References Cited

U.S. PATENT DOCUMENTS

| | | | |
|---|---|---|---|
| 2004/0022444 A1* | 2/2004 | Rhoads | 382/232 |
| 2004/0030738 A1* | 2/2004 | Haydock | H04N 21/235 709/200 |
| 2004/0244058 A1* | 12/2004 | Carlucci | G06F 3/0482 725/135 |
| 2005/0053300 A1* | 3/2005 | Mukerjee | H04N 19/105 382/239 |
| 2005/0190872 A1* | 9/2005 | Seong | H04N 21/23608 375/354 |
| 2005/0201471 A1* | 9/2005 | Hannuksela | H04N 21/44004 375/240.25 |
| 2005/0223034 A1 | 10/2005 | Kaneko | |
| 2007/0050780 A1* | 3/2007 | O'Dea | G06F 19/322 719/313 |
| 2007/0182528 A1* | 8/2007 | Breed et al. | 340/435 |
| 2007/0211801 A1* | 9/2007 | Matsubayashi | G09G 5/006 375/240.16 |
| 2008/0219332 A1* | 9/2008 | Brehler | 375/219 |
| 2008/0232589 A1* | 9/2008 | Chamberlain | H04K 1/00 380/275 |
| 2008/0262990 A1* | 10/2008 | Kapoor | G06F 9/505 706/20 |
| 2009/0034556 A1* | 2/2009 | Song | H04W 24/02 370/471 |
| 2009/0279889 A1* | 11/2009 | Kirkpatrick et al. | 398/41 |
| 2011/0167110 A1* | 7/2011 | Hoffberg et al. | 709/203 |
| 2011/0310911 A1* | 12/2011 | Froehler | H04L 1/1874 370/465 |
| 2011/0316973 A1* | 12/2011 | Miller et al. | 348/43 |
| 2013/0039278 A1* | 2/2013 | Bouazizi | H04L 65/4076 370/328 |

\* cited by examiner

VISUAL DYNAMIC RANGE TIMESTAMP TO ENHANCE DATA COHERENCY AND POTENTIAL OF METADATA USING DELAY INFORMATION

CROSS REFERENCE TO RELATED APPLICATIONS

This Application claims the benefit of priority to related, co-pending Provisional U.S. Patent Application No. 61/373,932 filed on 16 Aug. 2010.

BACKGROUND OF THE INVENTION

Technical Field of the Invention

The present invention relates in general to method and system for enhancing data coherency and potential of at least one metadata associated with a video data. More specifically, the present invention relates to an improved method and system for enhancing data coherency and potential use of at least one metadata associated with a frame of video data and for embedding the at least one metadata in a visual dynamic range (VDR) pipeline.

Description of the Related Art

Digital video broadcasting has developed into a versatile technology that enables the delivery of video, audio and other forms of multimedia possible. With the progression of this innovative technology, digital broadcast satellite television has become increasingly common. The broadcasters of the digital video adopt various digital video processing methods to assure the quality of video that they send to their customers. The digital video data is transmitted or broadcasted over several high speed transmission mediums that have different characteristics, and various standard video formats. The ability to ensure high quality video at the terminating display is difficult to implement.

One common method for enhancing the video quality is to embed metadata associated with a digital video frame or sequence of frames within a video pipeline. The metadata is largely useful for processing digital images in a visual dynamic range (VDR) format in which a wide range of intensity levels of the image is accurately represented.

Metadata needs to be applied to the correct video frame or sequence to be useful. To ensure metadata coherency in existing systems, metadata would need to be driven to the display at existing video frame rates. Transmission of high bandwidth metadata is not possible for all existing video processing systems and metadata transporting interfaces, like high definition multimedia interface (HDMI), digital visual interface (DVI), serial digital interface (SDI) and high-definition serial digital interface (HD-SDI). In fact, each metadata transporting interface not only differs in the method of metadata transportation but also has substantially different bandwidth capabilities effectively enabling only global type metadata to be transmitted.

Conventional methods for embedding metadata in a VDR pipeline have considerable drawbacks. For example, in an existing method, the metadata associated with the video data will not be coherent with the video data and results in lack of time synchronization. This occurs when the metadata is large and needs to be sent over a number of frames. Another major drawback in the existing method is the inability of the metadata transporting interface to transport metadata having high bandwidth. This is especially true as the bandwidth of the video content increases.

SUMMARY OF THE INVENTION

To minimize the limitations found in the prior art, and to minimize other limitations that will be apparent upon review of the present disclosure, the present invention provides a system, method, and device for enhancing data coherency. The present invention may further provide the use of at least one metadata associated with video data, which may be, for example, configured to operate in a visual dynamic range (VDR) format. The system may comprise a metadata framing structure which includes a header start of frame bit set for identifying a start of the metadata framing structure, a packet type bit set, a configuration bit set, a variable length configuration/metadata payload, a header end of frame bit set for identifying an end of the metadata framing structure, a timestamp bit set, and a checksum check bit set. The metadata frame may be serialized and embedded within a video frame or sequence of video frames. With a VDR formatted video frame, the serialize metadata frame may be embedded within a code word guard bit position of at least one color channel of the video data. The code word guard bit position may be, for example, adaptable to carry the at least one metadata having potentially high bandwidth. With a non-VDR formatted video frame, the serialize metadata frame may be embedded within the LSB position of at least one color channel of the video data. Further yet, the present invention allows the metadata to embed over any video interface.

In another aspect of the present invention, a method in accordance with the present invention is a method for implementing the metadata payload that characterizes a video frame or sequence into the metadata framing structure and embeds the metadata frame into video data frame within a VDR pipeline. In the method, video is captured with a camera or created through animation, placed into a post production, distributed, and finally displayed onto a terminating device. a camera in a capture unit captures a video data frame. Video data captured with the camera has associated metadata as specified by SMPTE RDD-18 or EXIF for still images that is part of its existing delivery system to post production. Animated video sequences are created through standard CGI method. In the process, associated metadata can also be created. The captured or created data and metadata is sent to a post production unit where the video output data is color timed by a color timing tool utilizing the upstream metadata as a guide. The color timing tool creates post production metadata that optionally supplements or replaces existing upstream metadata and is associated with the colour graded video content. The metadata can be embedded in the colour graded video or maintained in a separate file structure. The post production output data is sent to a video pre-processor unit by means of at least one distribution medium such satellite, broadcast, DVD, Blu-Ray, etc. In the video pre-processor unit, a video pre-processor metadata is added to the post production output data. The video-pre-processor unit generates a video pre-processor output data utilizing the post production output data and the video pre-processor metadata. The video pre-processor output data is sent to a display unit that utilizes an extended display identification data (EDID) interface to indentify its capabilities. Interpreting the EDID, upstream metadata, and the video preprocessor metadata, the video processor processes the video that is customized for the display. At each stage in the pipeline, timestamps are embedded in the metadata frame structure to associate the metadata with the correct video frame or sequence of frames thereby ensure coherency. It is of utmost importance that the metadata is received by the downstream device before it is required. The timestamp can be represented as a frame, sequence, actual time delay.

One objective of the invention is to provide a system for enhancing data coherency and potential use of at least one metadata associated with a video data configured to operate in the VDR format.

Another objective of the invention is to provide a method that would enhance data coherency and potential use of metadata associated with the video data.

A third objective of the invention is to provide a method that would allow the transportation of the metadata having potentially high bandwidth.

Yet another objective of the invention is to provide a method that would allow the metadata to embed over any metadata transporting interface adapting the VDR format.

These and other advantages and features of the present invention are described with specificity so as to make the present invention understandable to one of who is of ordinary skill in the art.

BRIEF DESCRIPTION OF THE DRAWINGS

Elements in the figures have not necessarily been drawn to scale and are provided to enhance clarity and improve understanding of the various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
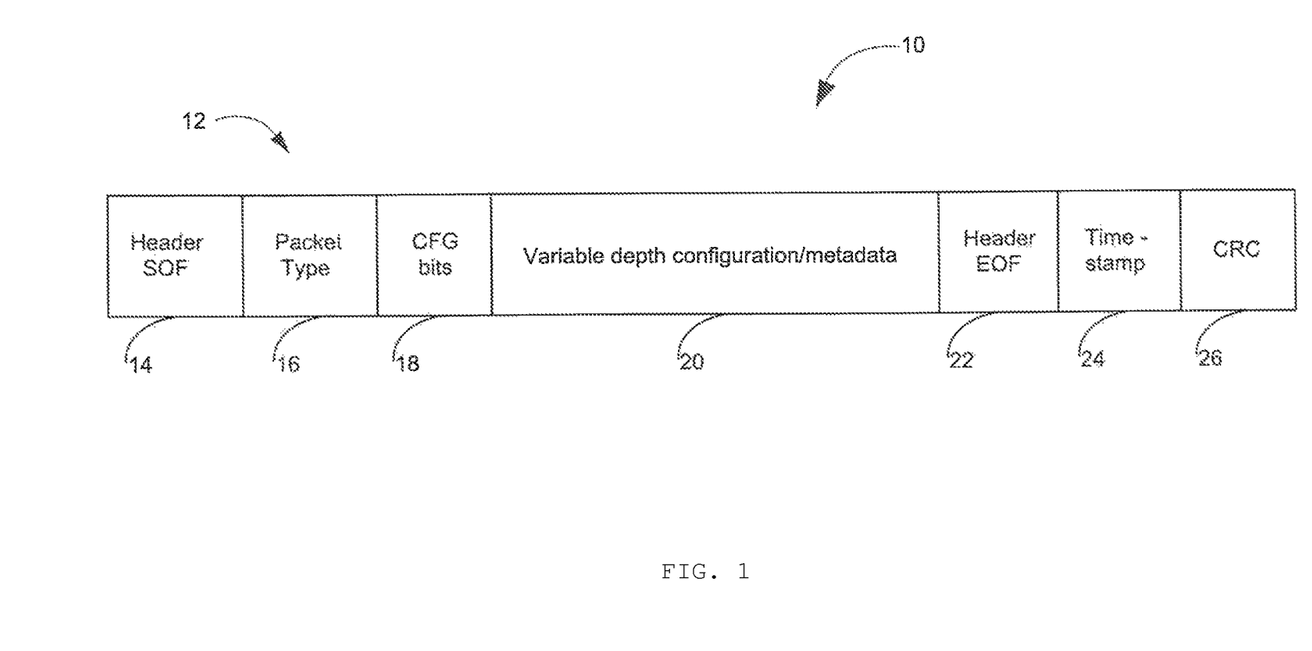
FIG. 1 is a diagrammatic representation of the present invention, illustrating a metadata framing structure.

FIG. 1 is a diagrammatic representation of a system 10 for framing the metadata which includes a header start of frame bit set 14 for identifying a start of the metadata framing structure 12, a packet type bits set 16, a configuration bits set 18, a variable length configuration/metadata payload 20, a header end of frame bit set 22 for identifying an end of the metadata framing structure 12, a timestamp bit set 24, and a checksum check bit set 26. The variable length configuration/ metadata payload 20 includes metadata associated with the video data. The metadata frame is serialized and embedded within a code word guard bit position (e.g., see FIG. 2, reference number 30) of at least one color channel (e.g., see FIG. 2, reference number 28) of the video data pixel container (all of FIG. 2). The code word guard bit position may be, for example, adaptable to carry the metadata having potentially high bandwidth.

The header start of frame bit set 14 and the header end of frame bit set 22 are embedded in a packet header of the metadata framing structure 12. The packet header is designed to set the start of frame bit set 14 or the end of frame bit set 22 either to zero or one. The packet header includes an end of payload bit (EOP) that enables a full data payload to be split amongst several packets. When the EOP bit is set, it indicates a data packet which is the last data payload. The EOP bit is used to interrupt low bandwidth and low priority packets and to maintain data integrity. The EOP bit allows the data payload to span a plurality of data frames. Start and end of frame headers may consist of several bits or bytes to uniquely identify the packet.

The packet type bit set 16 defines the data payload and format of a subsequent metadata. The packet type bit set 16 is used to characterize the data transmitted within the data payload. The configuration bit set 18 defines a configurable portion of the metadata framing structure 12 and enables an optional framing in the metadata framing structure 12. The timestamp bit set 24 specifies a frame delay count used to apply the at least one metadata to the video data thereby achieving a time synchronization. The timestamp bit set 24 provides a reference to align the at least one metadata with the video data for maintaining the data coherency. Metadata must be available at each stage of the pipeline before its associated video frame is processed. The timestamp enables metadata to be sent before it is required and realigned to the correct video frame. The checksum check bit set 26 verifies and improves the reliability of data contained in the metadata framing structure 12. The metadata framing structure 12 is designed to operate with at least one metadata transporting interface for example, high definition multimedia interface (HDMI), digital visual interface (DVI), serial digital interface (SDI) and high-definition serial digital interface (HD-SDI).

Figure 2:
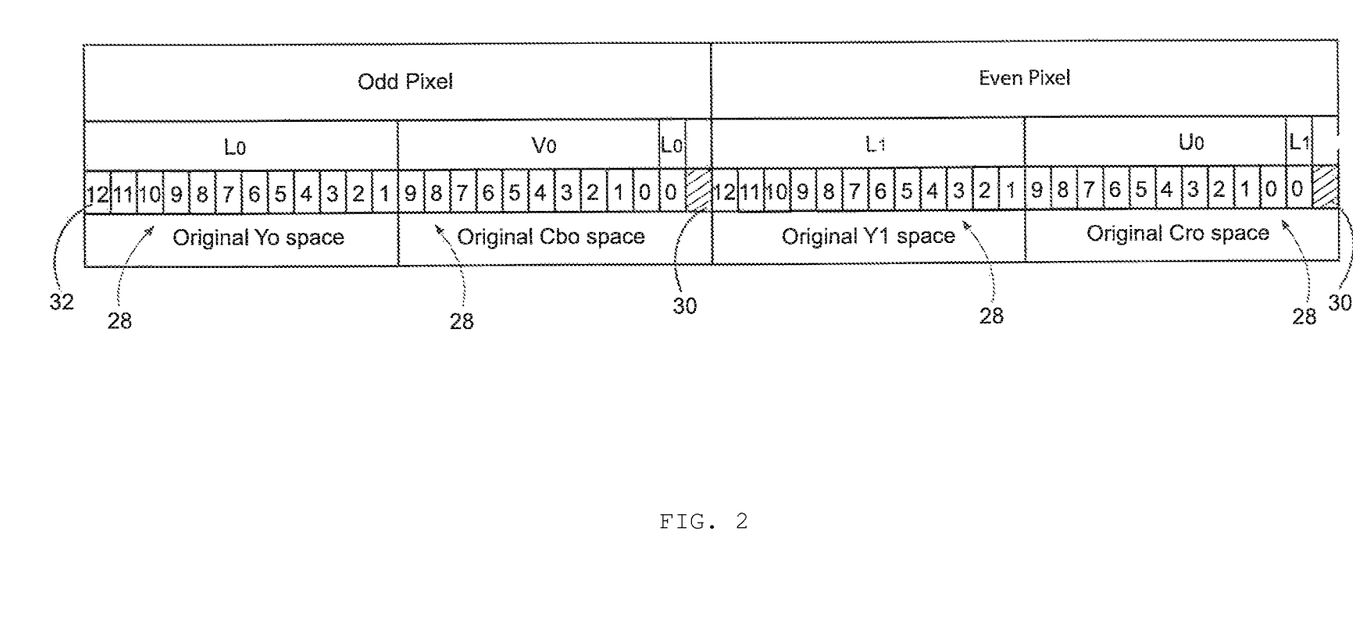
FIG. 2 is a diagrammatic representation of the present invention, illustrating at least one metadata embedded within a code word guard bit position of at least one color channel of a video data in a visual dynamic range (VDR) format.

FIG. 2 is a diagrammatic representation of the at least one metadata embedded within the code word guard bit position 30 of the at least one color channel 28 of the video data in the VDR format. The code word guard bit position 30 of the at least one color channel 28 is adaptable to carry a serial metadata of potentially unlimited bandwidth. The representation shown in FIG. 2 uses VDR logLuv format with HDMI interface as the at least one metadata transporting interface. For example, when the VDR data is represented in YCbCr 4:2:2 format, a guard bit position 32 in the 12$^{th}$ bit position of the at least one color channel 28 can also be used for embedding the at least one metadata with no loss of pixel precision.

Metadata frame can be embedded within a non visual dynamic range (non VDR) format by utilizing a least significant bit (LSB) of the at least one color channel 28. The LSB of each colour channel can be used with minimal degradation of the overall quality of the image. This is especially true as video content bit depths increase for each colour channel. A dithering process is applied to the video data for minimizing artifacts caused by the use of the LSB.

Figure 3:
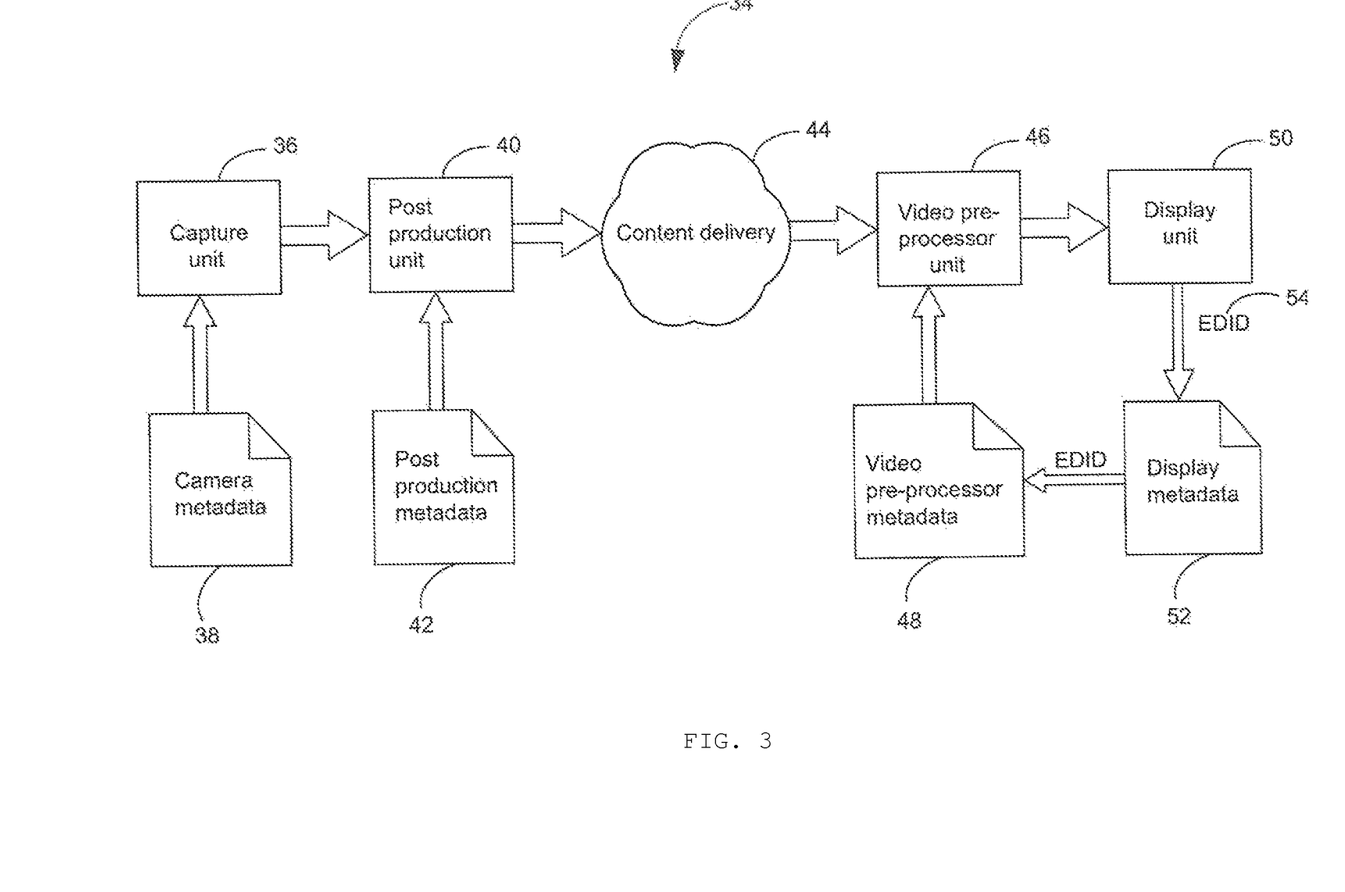
FIG. 3 is a block diagram of the present invention, illustrating a method for implementing the at least one metadata associated with a video data frame in a visual dynamic range pipeline.

FIG. 3 is a block diagram illustrating a method for implementing metadata embedded in the metadata framing structure 12 that characterizes a video data frame in a VDR pipeline 34. Through the used of timestamps data coherency is achieved to ensure the metadata is applied to the desired video frame or sequence of frames. A camera (not shown) in a capture unit 36 captures a video data frame. A camera metadata 38 is sent to the capture unit 36 and added to the video data frame. The capture unit 36 generates a capture output data utilizing the video data frame and the camera metadata 38. The camera metadata 38 includes a plurality of camera settings and environment parameters as defined in EXIF or SMPTE RDD-18. The capture output data is sent to a post production unit 40 where the capture output data is color timed by a color timing tool (not shown). The color timing tool (not shown) creates a post production metadata 42 and colour graded video content. The post production metadata 42 includes a plurality of production environment and content characterization parameters. The post production unit 40 generates a post production output data utilizing the post production metadata 42 and colour graded video content. The post production unit 40 may include an encoding unit. The post production output data is sent to a video pre-processor unit 46 by means of at least one transmission medium 44 such as satellite, broadcast, DVD, Blue-ray, etc.

In the video pre-processor unit 46, a video pre-processor metadata 48 is added to the post production output data. The video pre-processor metadata 48 includes a plurality of viewing environment characterization parameters. The video pre-processor unit 46 may include a decoding unit. The video-pre-processor unit 46 generates a video pre-processor output data utilizing the post production output data, extracted post production metadata, and the video pre-processor metadata 48 and display characterization data available through the extended display identification data (EDID) interface. The video pre-processor output data is processed accounting for the display units 50 capabilities and its environment. Embedded within the video pre-processor output data is metadata that can be utilized by the display unit. The metadata framing structure 12 being is configured with the timestamp bit set 24 to ensure data coherency. The display unit 50 utilizes the post production metadata 42 to tone and gamut map the video data frame. A display metadata 52 is extracted from the display unit 50 and the video pre-processor metadata 48 and the display metadata 52 are applied to the video pre-processor unit 46 for processing a subsequent video data frame utilizing the EDID interface 54. The display metadata 52 includes a plurality of display characterization parameters. The display unit 50 utilizes the EDID interface 54 to interpret the display capabilities of the display unit 50. The camera metadata 38, the post production metadata 42, the video pre-processor metadata 48 and the display metadata 52 enhances the quality of the video data.

Figure 4:
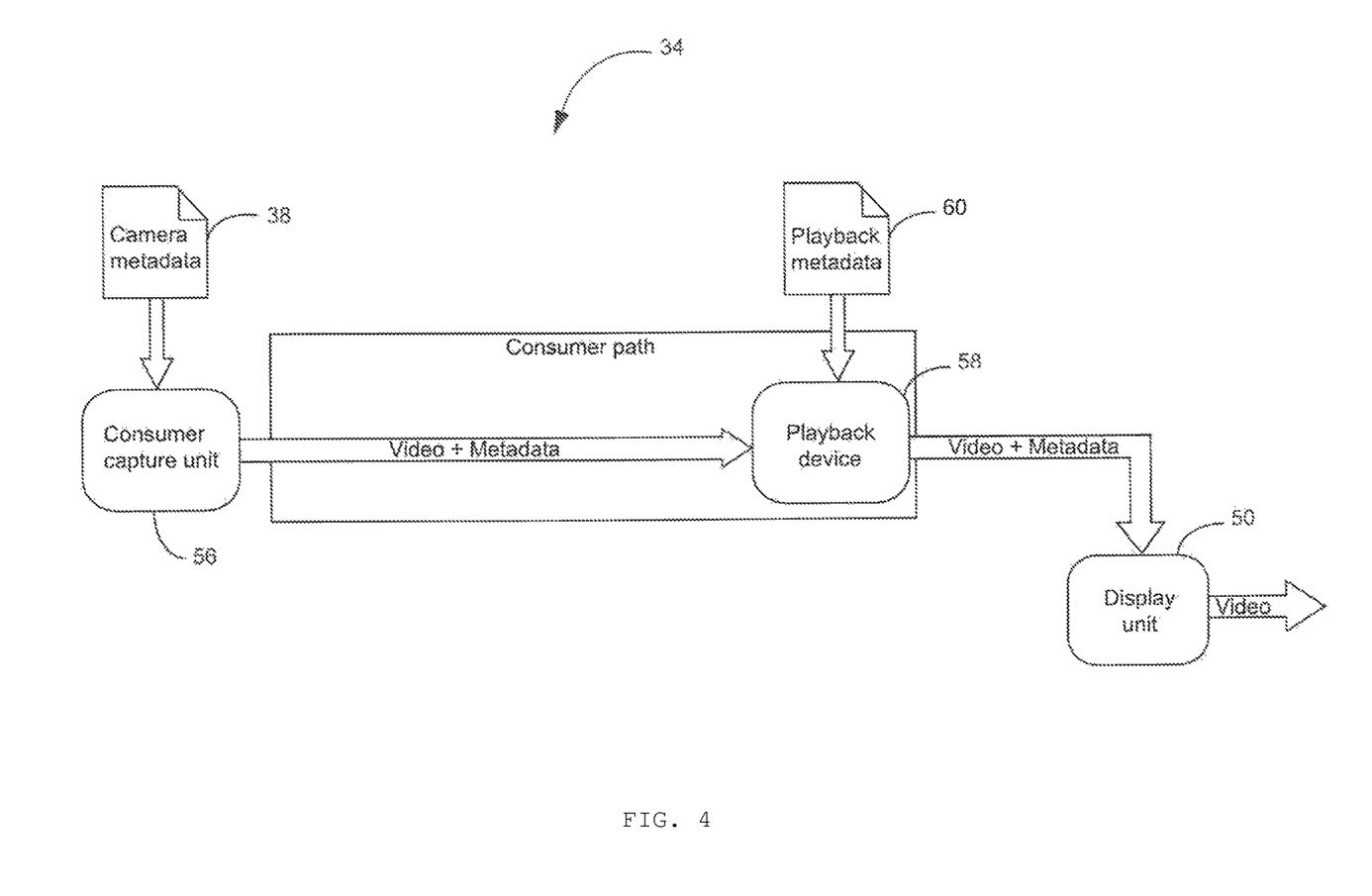
FIG. 4 a block diagram of the present invention, illustrating a method for embedding the at least one metadata associated with the video data frame in the VDR pipeline to enhance the visual experience of home captured movies for a consumer.
Figure 5:
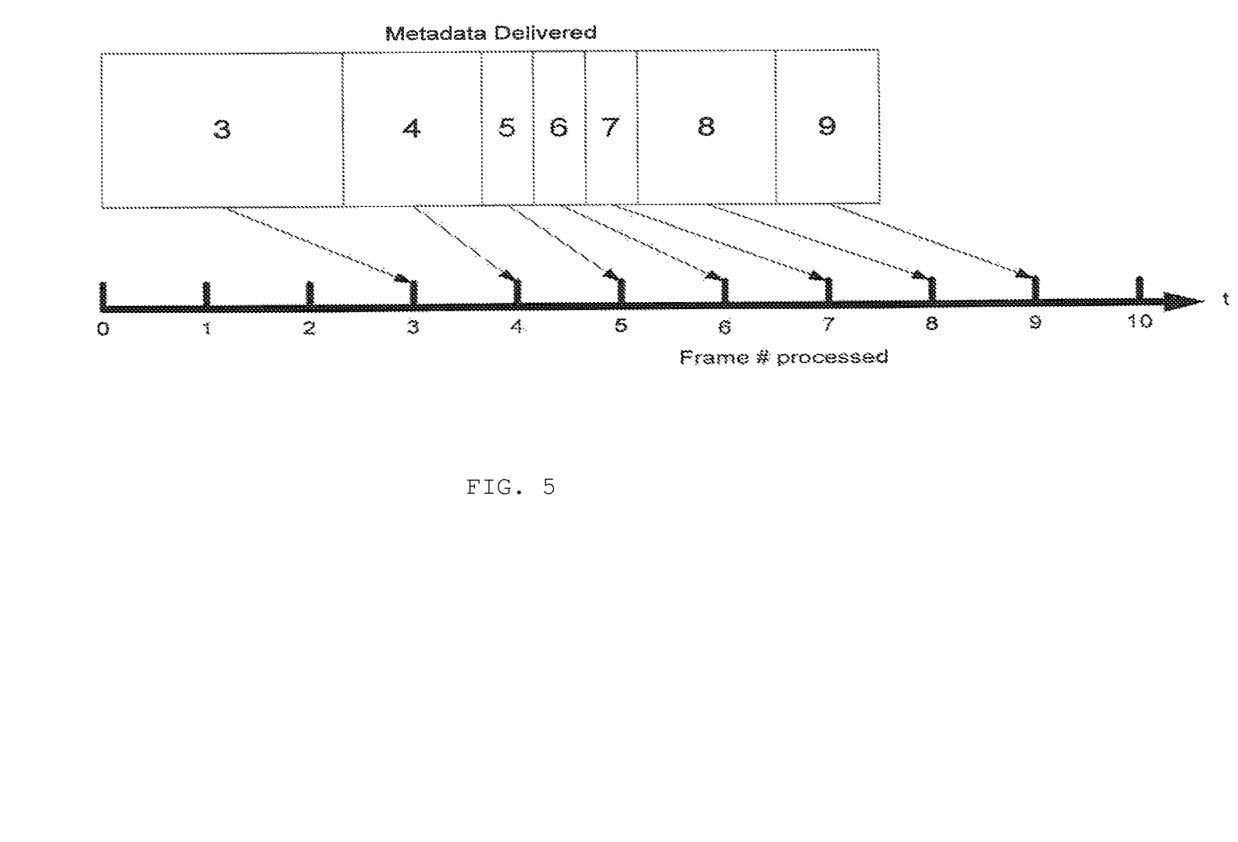
FIG. 5. shows metadata that may be delivered for a sequence of frames, and a timeline illustrating when the received metadata is to be applied.

FIG. 4 is a block diagram illustrating a method for embedding the at least one metadata associated with the video data frame in the VDR pipeline 34 to enhance the visual experience of home captured movies for a consumer. The consumer captures the video data frame using the VDR enabled camera (not shown). The video data frame is sent to a consumer capture unit 56 and embedded with the camera metadata 38. The consumer capture unit 56 generates a capture output data utilizing the video data frame and the camera metadata 38. The captured output data is sent to a playback device 58. A playback metadata 60 is sent to the playback device 58 and the capture output data is added to the playback metadata 60 to generate a playback output data. The playback device 58 interprets the display capabilities of the display unit 50 using the EDID interface 54. The EDID interface 54 enables the playback device 58 to map luminance and gamut of the video data to the capabilities of the display unit 50. The playback output data is sent to the display unit 50 which generates the video output data frame.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

In some situations, metadata is embedded in and delivered contemporaneously within the video frames for which the metadata is to be applied during processing or display of the video frames. In other situations, metadata which is to be applied for a particular video frame may be transmitted with the video data for one or more earlier video frames. Metadata may be delivered to and received by a video decoder, processor or other downstream device in advance of the particular video frame at which the metadata is to be applied. To facilitate processing of and application of metadata, the metadata packet(s) carrying a metadata payload may include a timestamp indicating when the metadata is to be applied. In some embodiments, the timestamp may be defined in terms of a frame delay indicating that the metadata is to be applied at a certain number of video frames after the metadata has been received. In other embodiments, the timestamp may be defined in terms of a time delay, a frame sequence number, a time relative to the start of the video, or the like FIG. 7 shows metadata 225 that is carried through a video delivery pipeline and received by a downstream device (e.g. video processor, decoder and/or display) in advance of the time at which the metadata is processed and applied. Metadata 225 includes six 15 metadata payloads, each associated with a video frame (i.e. one of video frames #3 through #9). As seen in FIG. 7, while the metadata payload associated with video frame #3 is being delivered to a downstream device, the downstream device is processing video frames #1 and 2. A timestamp for the metadata payload associated with video frame #3 may indicate that the metadata payload is to be applied three frames after the metadata payload is received.

What is claimed is:
1. A system for enhancing data coherency and potential of at least one metadata associated with a video data configured to operate in a visual dynamic range (VDR) format, the system comprising:
 a video encoder configured to associate video data with at least one metadata, the metadata further comprising:
 a metadata framing structure defined to include:
  a header start of frame bit set for identifying a start of the metadata framing structure;
  a packet type bit set for defining a payload and format of a subsequent metadata;
  a configuration bit set for defining a configurable portion of the metadata framing structure;
  a variable length configuration/metadata payload associated with the video data and at least one metadata associated with the video data;

a header end of frame bit set for identifying an end of the header;

a timestamp bit set for specifying a frame delay count to apply the at least one metadata to the video data; and a checksum check bit set for verifying data contained in the metadata framing structure;

whereby metadata is embedded within a code word guard bit of at least one color channel of the video data.

2. The system of claim 1, wherein the Least Significant Bit (LSB) of a pixel value in each color channel is utilized for non-VDR formats.

3. The system of claim 1 wherein the code word guard bit is adaptable to carry the at least one metadata having potentially high bandwidth.

4. The system of claim 1 wherein the metadata framing structure is designed to operate with at least one metadata transporting interface.

5. The system according to claim 4, wherein the metadata transporting interface is selected from a group consisting of high definition multimedia interface (HDMI), digital visual interface (DVI), serial digital interface (SDI) and high-definition serial digital interface (HD-SDI).

6. The system according to claim 4, wherein the metadata transporting interface comprises a display port.

7. The system of claim 1 wherein the packet type bit set is defined to characterize the data transmitted within a data payload.

8. The system of claim 1 wherein the configuration bit set enables an optional framing in the metadata framing structure.

9. The system of claim 1 wherein the timestamp bit set provides a reference to align the at least one metadata with the video data for maintaining the data coherency.

* * * * *